United States Patent [19]

Chyung et al.

[11] Patent Number: 4,707,458

[45] Date of Patent: Nov. 17, 1987

[54] GLASS-CERAMICS SUITABLE FOR RING LASER GYROS

[75] Inventors: Kenneth Chyung; Philip M. Fenn; Mark P. Taylor, all of Painted Post, N.Y.

[73] Assignee: Corning Glass Works, Corning, N.Y.

[21] Appl. No.: 740,762

[22] Filed: Jun. 3, 1985

[51] Int. Cl.$^4$ ............................................. C03C 10/14
[52] U.S. Cl. ......................................... 501/4; 501/69; 501/904; 65/33
[58] Field of Search .................. 501/4, 7, 69, 904; 65/33

[56] References Cited

U.S. PATENT DOCUMENTS 4,018,612 4/1977 Chyung .................................... 501/4

FOREIGN PATENT DOCUMENTS 1596863 1/1972 Fed. Rep. of Germany .......... 501/7

OTHER PUBLICATIONS

"Glass-Ceramics for High Precision-Optic Applications", Duke et al.

Primary Examiner—William R. Dixon, Jr.
Assistant Examiner—Karl Group
Attorney, Agent, or Firm—C. S. Janes, Jr.

[57] ABSTRACT

This invention relates to the production of transparent glass-ceramic bodies exhibiting properties especially suitable for use in ring laser gyros. The inventive products contain $\beta$-quartz solid solution as essentially the sole crystal phase and consist essentially, expressed in terms of weight percent on the oxide basis, of

| $SiO_2$ | 64–67 | ZnO | 0.7–4.2 |
| $Al_2O_3$ | 21–24 | $TiO_2$ | 2.0–3.25 |
| $Li_2O$ | 2.6–3.7 | $ZrO_2$ | 1.25–2.5 |
| MgO | 0.8–1.5 | $TiO_2 + ZrO_2$ | 4–5.25 |

4 Claims, No Drawings

GLASS-CERAMICS SUITABLE FOR RING LASER GYROS

BACKGROUND OF THE INVENTION

Ring laser gyros are devices designed to accurately detect changes in direction of the gyro frame. Their operation involves detecting apparent path length changes for light beams counterrotating around the ring. It is extremely critical that the coefficient of thermal expansion of a material intended for use as the frame be as small as possible. Hence, although some compensation can be made for thermal expansion in the design of active mirrors positioned on the frame, it is generally preferred that the coefficient of thermal expansion over the temperature range of $-50°$ to $+100°$ C. be held less than $0.66 \times 10^{-7}/°C$.

In addition to requiring a low coefficient of thermal expansion, the material must also display optical transparency. Clarity is demanded not only for accurate measurement of the frame, but is most critical when the material is used for the recombination prism. The function of this prism is to combine the light beams into a single unit which produces a fringe pattern on a detector when the frame is rotating. Light scatter due to haze and/or refractive index in homogeneity must be kept at a very low level to prevent spurious signals in the detector.

Finally, long term thermal stability and resistance to permanent deformation during thermal cycling are also necessary for the material to be used for the frame. The latter characteristic is especially important since poor resistance to deformation can impose essentially impossible requirements on the structure of the frame. Thus, permanent deformations resulting from thermal cycling will necessitate repeated recalibration of the path length of the gyro.

The basis for the production of glass-ceramic articles can be found in U.S. Pat. No. 2,920,971. As is explained therein, glass-ceramic or semicrystalline ceramic bodies, as such have been variously termed, are formed through general steps: (1) a glass-forming batch, in which a nucleating agent is normally included, is melted; (2) that melt is cooled to a temperature at least below the transformation range thereof and a glass body of a desired geometry simultaneously shaped therefrom; and (3) that glass body is subjected to a predetermined heat treatment to cause the in situ generation of crystals. Very frequently the crystallization is divided into two stages. In the first step the precursor glass body is heated to a temperature within or slightly above the transformation range for a period of time sufficient to develop nuclei in the glass. Thereafter, the nucleated glass is heated to a higher temperature, often approaching and exceeding the softening point of the glass, to cause the growth of crystals on the nuclei. This two-step method typically produces glass-ceramics of higher crystallinity wherein the crystals are more uniformly sized. (The transformation range has generally been defined as that temperature at which a melt is converted into an amorphous solid, that temperature normally being deemed to lie in the vicinity of the annealing point of a glass.)

SUMMARY OF THE INVENTION

We have devised a group of glass-ceramics exhibiting extremely high optical transparency, coefficients of thermal expansion over the temperature range of $-50°$ to $+100°$ C. between $-1$ to $+1 \times 10^{-7}/°C$., long term thermal stability, and excellent resistance to permanent deformation during thermal cycling from a straitly circumscribed region of compositions within the base $Li_2O$ $MgO$—$ZnO$—$Al_2O_3$—$SiO_2$ system nucleated with a combination of $TiO_2$ and $ZrO_2$. Hence, glass-ceramic articles demonstrating the above properties can be produced through a defined heat treatment applied to precursor glass bodies consisting essentially, expressed in terms of weight percent on the oxide basis, of:

| $SiO_2$ | 64–67 | $ZnO$ | 0.7–4.2 |
|---|---|---|---|
| $Al_2O_3$ | 21–24 | $TiO_2$ | 2.0–3.25 |
| $Li_2O$ | 2.6–3.7 | $ZrO_2$ | 1.25–2.5 |
| $MgO$ | 0.8–1.5 | $TiO_2 + ZrO_2$ | 4–5.25 |

When subjected to a nucleation heat treatment at temperatures between about 700°–750° C., followed by a crystallization heat treatment at temperatures between about 800°–900° C., submicroscopic crystals of $\beta$-quartz solid solution are developed in situ; the crystals being of such small size that haze resulting from light scattering can be virtually absent.

The rate of heating employed between the nucleation step and the crystallization step appears to be of the utmost importance in avoiding cracking of the nucleated glass body. To illustrate, a slow rate of heating, i.e., less than about 75° C./hour, provides sufficient time for stresses generated by volume changes during crystal growth to be relaxed; whereas a rapid heating rate, i.e., greater than about 150° C./hour, leads to crystallization taking place when the glass is at a lower viscosity such that stresses built up during crystal growth are reduced. Both modes of heating yield products which can be crack-free.

In contrast, an intermediate rate of heating ($\sim 100°$ C./hour) induces extensive cracking of the nucleated glass, especially when utilized in conjunction with nucleation temperatures at the upper extreme of the prescribed range.

Rapid rates of heating hazard thermal deformation of the nucleated glass body since the $\beta$-quartz solid solution crystals may not grow rapidly enough to physically support the body as the temperature approaches the softening point of the precursor glass. Consequently, the use of slower heating rates has been deemed preferable.

In general, a period of about 0.5–4 hours will be sufficient for nucleation and of about 1–4 hours will be adequate for crystallization. Longer periods of time may be utilized in each step, but with no substantive advantage. Moreover, prolonged time intervals can lead to excessive growth of the crystals, resulting in development of haze.

The inclusion of up to 2% $BaO$ appears to be helpful in improving the optical transparency of the inventive glass-ceramics by reducing haze. It has been postulated that the mechanism producing that effect resides in barium being segregated into the residual glass during the crystallization heat treatment, thereby raising the refractive index of the residual glass to more closely match the refractive index of the crystals, with the consequent result of reducing light scattering. Nevertheless, excessive amounts of $BaO$ increase the amount of residual glassy phase, thereby resulting in higher expansion.

It has long been recognized that the inclusion of $CeO_2$ in glass compositions utilized in the fabrication of television tube faceplates can reduce the effect of radiation browning. It has been postulated that the phenomenon is due to the cerium site trapping free electrons at $Ce^{+4}$ sites or vacancies at the $Ce^{+3}$ sites and shifting the resulting absorption band from the visible light region to the ultraviolet regime of the spectrum. Hardening against radiation darkening has been deemed to constitute an especially valuable asset for materials which are destined for use in an electron-rich environment such as a ring laser gyro, or if the material may be exposed to radiation in space, or if it may be subjected to a nuclear explosion. We have found that up to 1% $CeO_2$ may be incorporated in the inventive compositions to minimize radiation darkening without adversely affecting the thermal expansion or the transparency of the final products.

Up to about 1% $As_2O_3$ has been found useful as a fining agent. The use of $Sb_2O_3$ as a fining agent is well known in the glass art. Its substitution for a portion of the $As_2O_3$ is also recognized as being effective in controlling the $Ce^{+3}:Ce^{+4}$ ratio.

PRIOR ART

U.S. Pat. No. 3,484,328 is directed to transparent glass-ceramics especially designed for use as mirrors in reflecting telescopes having compositions consisting essentially, in weight percent, of:

| $SiO_2$ | 56–68 | $TiO_2$ | 0–6 |
|---|---|---|---|
| $Al_2O_3$ | 18–27 | $ZrO_2$ | 0–3 |
| $SiO_2 + Al_2O_3$ | ≦82 | $TiO_2 + ZrO_2$ | 2–6 |
| $Li_2O$ | 3.4–4.5 | $P_2O_5$ | 0–3 |
| CaO | 0–3 | $Na_2O$ | 0–1 |
| ZnO | 0–2 | MgO | 0–3 |
| $B_2O_3$ | 0–4 | CaO + $Na_2O$ + ZnO + MgO | 2.5–6 |

Although the cited ranges of components (including the optional constituents) are so broad as to overlap those of the inventive glass-ceramics, there is no description of the extremely restricted region of compositions necessary to produce glass-ceramics exhibiting the coefficient of thermal expansion, thermal stability, and resistance to permanent deformation during thermal cycling demanded in the inventive glass-ceramics.

U.S. Pat. No. 3,625,718 is drawn to low expansion, transparent glass-ceramics consisting essentially, in weight percent, of:

| $SiO_2$ | 64–74 | $TiO_2 + \frac{1}{2}ZrO_2$ | ≧2.2 |
|---|---|---|---|
| $Al_2O_3$ | 15–23 | $Li_2O$ + ZnO | >4.7 |
| $Li_2O$ | 3.3–4.8 | MgO | 0–2.5 |
| ZnO | 1–3.8 | CaO | 0–2.5 |
| $TiO_2$ | 1.2–2.4 | ZnO:MgO | ≧1 |
| $ZrO_2$ | 0–2 | ZnO:CaO | ≧1 |

There is no discussion of products having compositions within the rigorously limited ranges of the inventive glass-ceramics and the special properties displayed thereby. Furthermore, the $TiO_2$ content is below the minimum specified in the inventive compositions.

U.S. Pat. No. 3,677,785 is concerned with low expansion, transparent glass-ceramics consisting essentially, in weight percent, of:

| $SiO_2$ | 65–75 | MgO | 1.3–2 |
|---|---|---|---|
| $Al_2O_3$ | 15–25 | BaO + MgO | 2.6–5 |
| $Li_2O$ | 2.5–4.5 | $ZrO_2$ | 1–2 |
| BaO | 1.3–4 | $TiO_2$ | 1–2 |

ZnO is nowhere mentioned and the level of $TiO_2$ is below the minimum required in the inventive glass-ceramics.

U.S. Pat. No. 3,788,865 describes the preparation of colored, transparent glass-ceramics consisting essentially, in weight percent, of:

| $SiO_2$ | 50–75 | alkaline earth oxides | 0–4.5 |
|---|---|---|---|
| $Al_2O_3$ | 16–35 | $ZrO_2 + TiO_2 + SnO_2$ | ≧10 |
| $SiO_2 + Al_2O_3$ | 75–92 | $P_2O_5$ | 0–3 |
| $Li_2O$ | 3–5.5 | $F_2$ | 0–2 |
| $B_2O_3$ | 0–9 | ZnO | 0–4 |
| $ZrO_2$ | 0–5 | $Na_2O$ | 0–2 |
| $TiO_2$ | 0–10 | Colorant | 0.005–2 |
| $SnO_2$ | 0–5 | | |

As was the situation with U.S. Pat. No. 3,484,328 above, the extremely broad ranges of the patent overlap those of the inventive glass-ceramics. But again, there is no discussion of glass-ceramics having compositions within the narrow confines of the inventive materials and the unique properties exhibited thereby.

U.S. Pat. No. 4,018,612 discloses transparent glass-ceramic articles consisting essentially, in weight percent, of:

| $SiO_2$ | 67–70 | ZnO | 1–2 |
|---|---|---|---|
| $Al_2O_3$ | 17.75–20 | BaO | 0–2 |
| $Li_2O$ | 2.5–3.5 | $TiO_2$ | 2–4.5 |
| MgO | 1.5–2.5 | $ZrO_2$ | 1–2 |

The $Al_2O_3$ content is below the minimum required in the present inventive compositions and the $SiO_2$ and MgO levels are generally above those of the present invention.

U.S. Pat. No. 4,093,468 discusses the production of essentially transparent glass-ceramics consisting essentially, in weight percent, of 3–4% $Li_2O$, 15–25% $Al_2O_3$, 60–70% $SiO_2$, 0.5–6% $TiO_2$, up to 500 ppm $Fe_2O_3$, and 0.03–0.75% $Nd_2O_3$. The four working examples provided contained 0–1.8% MgO, 0.3–6% ZnO, 1.5–2% $ZrO_2$, and 0–1.3% BaO. The thrust of the invention involved the use of $Nd_2O_3$ to decolorize the products which would otherwise exhibit a yellow tint because of the presence of $TiO_2$ and $Fe_2O_3$.

Yet again, as was observed above with respect to U.S. Pat. Nos. 3,484,328 and 3,788,865, the extremely broad ranges of this patent overlap those of the inventive glass-ceramics. But, in like manner to the two previous disclosures, there is no description of glass-ceramics exhibiting the exceptional properties displayed by the inventive products because of their specifically delineated compositions.

U.S. Pat. No. 4,438,210 presents transparent glass-ceramics designed for use as stove windows consisting essentially, in weight percent, of:

| $SiO_2$ | 65–75 | $TiO_2$ | 2–6 |
|---|---|---|---|
| $Al_2O_3$ | 15–25 | $ZrO_2$ | 0–2 |
| $Li_2O$ | 1–4 | BaO | 0–2.5 |
| ZnO | 0.5–2 | F | 0–1.2 |

| -continued | | | |
|---|---|---|---|
| Na$_2$O and/or K$_2$O | 0–2 | MgO | absent |

Not only is there no disclosure of glass-ceramics having the unique characteristics demonstrated by the inventive products, but also the explicit demand that MgO be avoided places those compositions outside those of the instant invention.

DESCRIPTION OF PREFERRED EMBODIMENTS

Table I records a group of glass compositions, expressed in terms of parts by weight on the oxide basis, illustrating the compositional parameters of the instant invention. Inasmuch as the sum of the individual components totals or closely approximates 100, for all practical purposes the values reported can be deemed to reflect weight percent. The actual ingredients used in preparing batches therefor may comprise any materials, either an oxide or other compound, which, when melted together, will be converted into the desired oxide in the proper proportions.

About 1000 grams of batch constituents were compounded, ballmilled together to assist in obtaining a homogeneous melt, and charged into platinum crucibles. After placing lids thereon, the crucibles were introduced into a furnace operating at about 1650° C., and the batches melted for about 16 hours. The melts were poured into steel molds to form glass slabs having dimensions of about 5"×5"×0.5" and those slabs immediately transferred to an annealer operating at 650° C. As$_2$O$_3$ was included to perform its customary function as a fining agent.

TABLE I

| | 1 | 2 | 3 | 4 | 5 | 6 |
|---|---|---|---|---|---|---|
| SiO$_2$ | 66.10 | 66.60 | 65.90 | 66.10 | 66.20 | 66.80 |
| Al$_2$O$_3$ | 21.70 | 21.90 | 21.70 | 21.70 | 21.70 | 22.00 |
| Li$_2$O | 3.36 | 3.39 | 3.35 | 3.36 | 3.37 | 3.40 |
| MgO | 1.29 | 1.49 | 1.28 | 1.07 | 0.86 | 1.50 |
| ZnO | 1.59 | 1.29 | 1.58 | 1.59 | 1.59 | 1.30 |
| BaO | 0.82 | — | 0.81 | 0.82 | 0.82 | — |
| TiO$_2$ | 2.70 | 2.70 | 2.70 | 2.70 | 2.70 | 2.30 |
| ZrO$_2$ | 1.70 | 1.70 | 1.70 | 1.70 | 1.70 | 1.70 |
| As$_2$O$_3$ | 0.70 | 1.00 | 1.00 | 1.00 | 1.00 | 1.00 |

| | 7 | 8 | 9 | 10 | 11 | 12 |
|---|---|---|---|---|---|---|
| SiO$_2$ | 63.80 | 63.90 | 64.10 | 64.20 | 64.30 | 64.50 |
| Al$_2$O$_3$ | 23.50 | 23.50 | 23.60 | 23.60 | 23.70 | 23.70 |
| Li$_2$O | 3.67 | 3.68 | 3.69 | 3.70 | 3.71 | 3.72 |
| MgO | 1.28 | 1.07 | 0.86 | 1.51 | 1.73 | 1.95 |
| ZnO | 1.58 | 1.59 | 1.59 | 1.59 | 1.16 | 0.73 |
| BaO | 0.81 | 0.82 | 0.82 | — | — | — |
| TiO$_2$ | 2.70 | 2.70 | 2.70 | 2.70 | 2.70 | 2.70 |
| ZrO$_2$ | 1.70 | 1.70 | 1.70 | 1.70 | 1.70 | 1.70 |
| As$_2$O$_3$ | 1.00 | 1.00 | 1.00 | 1.00 | 1.00 | 1.00 |

| | 13 | 14 | 15 | 16 | 17 | 18 |
|---|---|---|---|---|---|---|
| SiO$_2$ | 67.10 | 65.60 | 64.20 | 65.30 | 64.72 | 67.10 |
| Al$_2$O$_3$ | 20.80 | 22.20 | 23.60 | 22.90 | 22.00 | 20.00 |
| Li$_2$O | 3.60 | 3.70 | 3.70 | 3.77 | 3.57 | 3.50 |
| MgO | 1.50 | 1.50 | 1.50 | 1.91 | — | — |
| ZnO | 1.60 | 1.60 | 1.60 | 1.14 | — | 0.80 |
| BaO | — | — | — | — | 4.06 | 0.80 |
| TiO$_2$ | 2.70 | 2.70 | 2.70 | 1.91 | 1.82 | 4.60 |
| ZrO$_2$ | 1.70 | 1.70 | 1.70 | 1.84 | 1.91 | 1.60 |
| As$_2$O$_3$ | 1.00 | 1.00 | 1.00 | 0.69 | 0.77 | 0.60 |
| Na$_2$O | — | — | — | — | 0.93 | 0.40 |
| K$_2$O | — | — | — | 0.54 | 0.22 | 0.60 |

Bars having dimensions of about 5"×0.5"×0.2" were cut from the glass slabs and those bars plus the remainder of each glass slab placed into an electrically-heated furnace and heated at about 300° C./hour to the nucleation temperature (700°–750° C.). After maintaining that temperature for one hour, the temperature was raised at 50° C./hour to the crystallization temperature (800°–900° C.) where it was held for two hours. The electric current was then cut off and the specimens allowed to cool within the furnace (at an average of about 100° C./hour) to below 400° C., at which point they were removed from the furnace and cooled in the ambient environment.

Coefficients of thermal expansion (25°–300° C.) were measured on 2" lengths cut from the above bars employing horizontal dilatometers. X-ray diffraction and electron microscopy revealed highly crystalline bodies containing β-quartz solid solution having diameters of less than about 500 Å as essentially the sole crystal phase. The transparency of the samples was examined visually and categorized as follows:

(1) highly transparent with haze detectable only when viewed under optimal light scattering conditions;

(2) transparent with haze barely perceptible when viewed under standard conditions; and (3) transparent, but haze level too great for desired use.

Table II records the nucleation temperature (Nucl. T.) and crystallization temperature (Cryst. T.) in °C. to which each example was subjected; the visual appearance of each specimen utilizing the above ranking system; and the coefficient of thermal expansion (Coef. Exp.), expressed in terms of ×10$^{-7}$/°C., measured on each sample.

TABLE II

| Example | Nucl. T. | Cryst. T. | Visual Description | Coef. Exp. |
|---|---|---|---|---|
| 1 | 720 | 850 | 1 | −0.1 |
| 2 | 720 | 850 | 1 | 1.3 |
| 3 | 720 | 850 | 1 | 0.2 |
| 4 | 720 | 850 | 1 | −0.5 |
| 5 | 720 | 850 | 1 | −2.6 |
| 6 | 720 | 830 | 1 | −1.1 |
| 7 | 720 | 850 | 1 | −1.9 |
| 8 | 720 | 850 | 1 | −2.4 |
| 9 | 720 | 850 | 1 | −4.0 |
| 10 | 725 | 825 | 2 | 0.7 |
| 11 | 725 | 825 | 2 | 2.7 |
| 12 | 725 | 825 | 2 | 2.8 |
| 13 | 750 | 875 | 2 | 1.0 |
| 14 | 750 | 875 | 2 | −0.1 |
| 15 | 750 | 875 | 2 | 0.8 |
| 16 | 700 | 840 | 2 | 4.1 |
| 17 | 700 | 850 | 3 | 2.0 |
| 18 | 750 | 875 | 3 | 0.9 |

Examples 1–6 exhibited excellent transparency with essentially no haze. A comparison of Example 2 with Examples 3–5 illustrates that BaO tends to lower the thermal expansion of the glass-ceramic. Examples 1–6 also demonstrate the effectiveness of varying MgO content to control the thermal expansion of the inventive products.

Examples 7–10 again manifest the effect which MgO exercises on the thermal expansion and that the inclusion of BaO can have a salutary effect upon the degree of transparency. Examples 10–12 display the effect on thermal expansion of substituting MgO for ZnO on a molar basis. In general, raising MgO at the expense of ZnO results in higher thermal expansions. However, Examples 7–9 illustrate that the substitution of MgO for ZnO is not necessarily required for that effect; merely increasing the level of MgO will accomplish the same purpose.

Example 13 evidenced substantial cracking believed to have been caused through a combination of low $Al_2O_3$ with high $SiO_2$ contents. Examples 14 and 15 appeared to be free from cracking with satisfactorily low expansion. Unfortunately, the haze level was too high for the desired product application.

Examples 16–18 introduced alkali metal oxides in partial substitution of MgO, ZnO, and BaO. Their effect upon thermal expansion is quite evident but Example 18, exhibiting a desirably low expansion, was deemed to display a level of haze too great for the intended application. Example 18 was also too strongly absorbing due to the high level of $TiO_2$.

Table III reports another group of glass compositions, expressed in terms of parts by weight on the oxide basis, operable in the present invention. In like manner to the compositions of Table I supra, because the sum of the individual constituents totals or closely approaches 100, for all practical purposes the values recited can be deemed to indicate weight percent. The actual batch ingredients may comprise any materials, either oxides or other compounds, which, when melted together, will be converted into the desired oxide in the proper proportions.

The batch components were compounded, ballmilled together to aid in securing a homogeneous melt, and deposited into platinum crucibles. After placing lids thereon, the crucibles were initially introduced into a furnace operating at about 1650° C. and the batches melted for about 16 hours. (Later experience indicated that the melting and fining characteristics could be somewhat improved by first melting the batch for 16 hours at 1550° C. followed by 2–4 hours at 1650° C.) The melts were poured into graphite molds to form slabs having dimensions of about 5″×5″×0.5″ and those slabs were immediately transferred to an annealer operating at 650° C. $As_2O_3$ performed its customary function as a fining agent.

A portion of each glass slab was moved into an electrically-heated furnace and crystallized to a glass-ceramic body by being subjected to the following heat treatment schedule:

(a) heat from room temperature to 720° C. at 300° C./hour;
(b) hold at 720° C. for 1 hour;
(c) heat from 720° to 840° C. at 60° C./hour;
(d) hold at 840° C. for 2 hours; and then
(e) cool to room temperature at furnace rate Bars having the dimensions of about 2″×0.5″×0.2″ were cut from the crystallized bodies and coefficients of thermal expansion determined over the temperature range 25°–100° C. In like manner to the compositions set forth above in Table I, the bodies were highly crystalline and contained β-quartz solid solution having diameters of less than about 500 Å as virtually the sole crystal phase.

Table III also records the visual appearance of each crystallized specimen (Appear.), utilizing the ranking system described above with respect to Table II, and the coefficient of thermal expansion (Exp.), expressed in terms of $\times 10^{-7}/°C.$, measured on each sample.

TABLE III

|  | 19 | 20 | 21 | 22 | 23 | 24 |
|---|---|---|---|---|---|---|
| $SiO_2$ | 66.50 | 65.50 | 65.20 | 65.40 | 65.90 | 65.90 |
| $Al_2O_3$ | 21.80 | 21.50 | 21.40 | 21.50 | 21.60 | 21.60 |
| $Li_2O$ | 3.62 | 2.91 | 2.73 | 3.17 | 3.20 | 3.20 |
| MgO | 1.39 | 1.15 | 0.88 | 1.27 | 1.28 | 1.28 |
| ZnO | 0.74 | 2.97 | 3.94 | 1.98 | 1.99 | 1.99 |
| BaO | 0.82 | 0.81 | 0.81 | 0.81 | 0.25 | — |
| $CeO_2$ | — | — | — | 0.80 | 0.63 | 0.91 |
| $TiO_2$ | 2.70 | 2.70 | 2.70 | 2.70 | 2.70 | 2.70 |
| $ZrO_2$ | 1.70 | 1.70 | 1.70 | 1.70 | 1.70 | 1.70 |
| $As_2O_3$ | 0.70 | 0.70 | 0.70 | 0.70 | 0.70 | 0.70 |
| Appear. | 1 | 1 | 1 | 1 | 1 | 1 |
| Exp. | −0.2 | 0.1 | 0.0 | 0.5 | 0.0 | 0.1 |

Examples 22–24 illustrate that it is possible to include $CeO_2$ in the compositions, either as a simple addition thereto or as a substitution for part or all of the BaO in the system, without sacrificing the desired essentially zero expansion or adversely affecting transparency. It is believed that the $CeO_2$ is concentrated in the residual glassy phase of the glass-ceramic bodies. Careful regulation of the redox conditions of the melt, either through selection of the batch materials, e.g., control of the arsenic level, or through control of the melting conditions, should be observed to insure the proper $Ce^{+3}:Ce^{+4}$ level and, hence, produce the optimum resistance to radiation darkening.

Whereas Example 1–15 of Table I exhibited excellent transparency, the reduction of $As_2O_3$ to 0.7% from 1% appeared to result in even better transparency, while still satisfactorily performing its function as a fining agent.

We claim:

1. A highly crystalline, virtually haze-free, glass-ceramic body exhibiting extremely high optical transparency, a coefficient of thermal expansion over the temperature range of −50° to +100° C. between −1 to $+1 \times 10^{-7}/°C.$, long term thermal stability, and excellent resistance to permanent deformation during thermal cycling, and containing β-quartz solid solution crystals having diameters of less than about 500 Å as essentially the sole crystal phase, consisting essentially, expressed in terms of weight percent on the oxide basis, of:

| $SiO_2$ | 64–67 | ZnO | 0.7–4.2 |
|---|---|---|---|
| $Al_2O_3$ | 21–24 | $TiO_2$ | 2.0–3.25 |
| $Li_2O$ | 2.6–3.7 | $ZrO_2$ | 1.25–2.5 |
| MgO | 0.8–1.5 | $TiO_2 + ZrO_2$ | 4–5.25 |

2. A glass-ceramic body according to claim 1 also containing up to 5% total of an oxide selected from the group in the indicated proportions consisting of up to 1% $As_2O_3$, up to 1% $Sb_2O_3$, up to 1% $CeO_2$, and up to 2% BaO.

3. A method for making a highly crystalline, virtually haze-free, glass-ceramic body exhibiting extremely high optical transparency, a coefficient of thermal expansion over the temperature range of −50° to +100° C. between −1 to $+1 \times 10^{-7}/°C.$, long term thermal stability, and excellent resistance to permanent deformation during thermal cycling, and containing β-quartz solid solution crystals having diameters of less than about 500 Å as essentially the sole crystal phase, comprising the steps of:

(a) melting a batch for a glass consisting essentially, expressed in terms of weight percent on the oxide basis, of

| | | | |
|---|---|---|---|
| SiO$_2$ | 64–67 | ZnO | 0.7–4.2 |
| Al$_2$O$_3$ | 21–24 | TiO$_2$ | 2.0–3.25 |
| Li$_2$O | 2.6–3.7 | ZrO$_2$ | 1.25–2.5 |
| MgO | 0.8–1.5 | TiO$_2$ + ZrO$_2$ | 4–5.25 |

(b) cooling said melt to a temperature at least below the transformation range thereof and simultaneously forming a glass article therefrom;

(c) heating said glass article to a temperature between about 700°–750° C. and maintaining a temperature within that range for a period of time sufficient to develop nuclei therein;

(d) heating said article with nuclei therein at a rate not exceeding about 75° C./hour to a temperature between about 800°–900° C. and maintaining a temperature within that range for a period of time sufficient to grow submicroscopic crystals of β-quartz solid solution on said nuclei to form a glass-ceramic article; and then (e) cooling said glass-ceramic article to room temperature.

4. A method according to claim 3 wherein said glass also contains up to 5% total of an oxide selected from the group in the indicated proportions consisting of up to 1% As$_2$O$_3$, up to 1% Sb$_2$O$_3$, up to 1% CeO$_2$, and up to 2% BaO.

* * * * *